(12) United States Patent
Cai

(10) Patent No.: US 10,886,845 B2
(45) Date of Patent: *Jan. 5, 2021

(54) DETECTION METHOD, DETECTION CIRCUIT, CONTROLLER AND SWITCHING POWER SUPPLY

(71) Applicant: Silergy Semiconductor Technology (Hangzhou) LTD, Hangzhou (CN)

(72) Inventor: Bo Cai, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/737,466

(22) Filed: Jan. 8, 2020

(65) Prior Publication Data

US 2020/0144914 A1    May 7, 2020

Related U.S. Application Data

(63) Continuation of application No. 15/975,910, filed on May 10, 2018, now Pat. No. 10,566,900.

(30) Foreign Application Priority Data

May 15, 2017    (CN) .......................... 2017 1 0338452

(51) Int. Cl.
*H02M 3/156*    (2006.01)
*H02M 1/08*    (2006.01)
*H02M 1/00*    (2006.01)

(52) U.S. Cl.
CPC ............. *H02M 3/156* (2013.01); *H02M 1/08* (2013.01); *H02M 2001/0009* (2013.01); *H02M 2001/0025* (2013.01)

(58) Field of Classification Search
CPC ................... H02M 1/08; H02M 3/156; H02M 2001/0009; H02M 2001/0025; H02M 3/335

See application file for complete search history.

(56) References Cited

U.S. PATENT DOCUMENTS

| 4,035,703 | A | * | 7/1977 | Hablutzel | H02M 3/155 388/833 |
| 5,892,671 | A | * | 4/1999 | Fran.cedilla.ois | H03K 4/62 363/131 |
| 8,115,402 | B2 | | 2/2012 | Kuang et al. | |
| 8,922,174 | B2 | * | 12/2014 | Xu | H02M 1/4225 323/207 |
| 9,054,592 | B2 | | 6/2015 | Yao et al. | |
| 9,054,597 | B2 | * | 6/2015 | Zhao | H02M 1/42 |
| 9,225,168 | B2 | * | 12/2015 | Ogawa | H02J 1/00 |
| 9,287,793 | B2 | * | 3/2016 | Zhang | H02M 3/33592 |

(Continued)

*Primary Examiner* — Yusef A Ahmed

(74) *Attorney, Agent, or Firm* — Michael C. Stephens, Jr.

(57) ABSTRACT

Detecting an output voltage of a switching power supply can include: acquiring a first branch current that changes with a first voltage at a first terminal of an inductor of the switching power supply; acquiring a second branch current that changes with a second voltage at a second terminal of the inductor; controlling the first and second branch currents to flow to a same detection terminal; and detecting the output voltage based on a first current flowing through the detection terminal during a first time period, and a second current flowing through the detection terminal during a second time period.

10 Claims, 2 Drawing Sheets

(56) References Cited

U.S. PATENT DOCUMENTS

| | | | |
|---|---|---|---|
| 9,391,511 B2 | 7/2016 | Yu et al. | |
| 9,559,591 B2* | 1/2017 | Hang | H02M 3/1584 |
| 9,577,533 B2 | 2/2017 | Yu et al. | |
| 9,755,521 B2* | 9/2017 | Cai | H02M 1/14 |
| 9,991,811 B1* | 6/2018 | Song | H02M 3/33592 |
| 10,110,131 B2* | 10/2018 | Yu | H02M 3/1584 |
| 10,122,257 B2* | 11/2018 | Huang | G05F 1/56 |
| 2004/0004470 A1* | 1/2004 | Yoshida | H02M 3/1563 |
| | | | 323/284 |
| 2010/0128499 A1* | 5/2010 | Mansfield | H02M 3/155 |
| | | | 363/21.01 |
| 2010/0327838 A1* | 12/2010 | Melanson | H02M 3/156 |
| | | | 323/311 |
| 2011/0084677 A1* | 4/2011 | Shi | H02M 3/156 |
| | | | 323/284 |
| 2011/0199023 A1* | 8/2011 | Zimmermann | H05B 45/37 |
| | | | 315/297 |
| 2012/0026766 A1* | 2/2012 | Adragna | H02M 1/4225 |
| | | | 363/84 |
| 2012/0086422 A1 | 4/2012 | Ito et al. | |
| 2012/0112795 A1 | 5/2012 | Wang et al. | |
| 2012/0139514 A1* | 6/2012 | Paatero | H02M 3/156 |
| | | | 323/282 |
| 2013/0241512 A1* | 9/2013 | Yamada | H02M 3/156 |
| | | | 323/283 |
| 2014/0112028 A1* | 4/2014 | Fahlenkamp | H02M 3/33523 |
| | | | 363/21.12 |
| 2015/0311807 A1 | 10/2015 | Oswald et al. | |
| 2016/0109488 A1* | 4/2016 | Dearborn | H02M 3/156 |
| | | | 324/76.11 |
| 2016/0197545 A1* | 7/2016 | Nemoto | G01R 19/32 |
| | | | 363/78 |
| 2016/0294292 A1 | 10/2016 | Huang et al. | |
| 2016/0301407 A1* | 10/2016 | Chen | H02M 1/08 |
| 2017/0213677 A1* | 7/2017 | Yu | H01H 47/223 |

* cited by examiner

DETECTION METHOD, DETECTION CIRCUIT, CONTROLLER AND SWITCHING POWER SUPPLY

RELATED APPLICATIONS

This application is a continuation of the following application, U.S. patent application Ser. No. 15/975,910, filed on May 10, 2018, and which is hereby incorporated by reference as if it is set forth in full in this specification, and which also claims the benefit of Chinese Patent Application No. 201710338452.4, filed on May 15, 2017, which is incorporated herein by reference in its entirety.

FIELD OF THE INVENTION

The present invention generally relates to the field of power electronic technology, and more particularly to detection methods and circuits, and associated controllers and switching power supplies.

BACKGROUND

A switching power supply may generally include a main power converter and a controller. The controller in the switching power supply can connect to the main power converter, and the controller may output a switching control signal to control a main switch in the main power converter to be turned on or turned off, such that the switching power supply converts the input voltage into the voltage output required by the load. In order to prevent the power supply chip from being damaged due to a too high output voltage of the switching power supply, the controller may be provided with an output voltage detection circuit in order to achieve the output overvoltage protection for the switching power supply.

DETAILED DESCRIPTION

Figure 1:
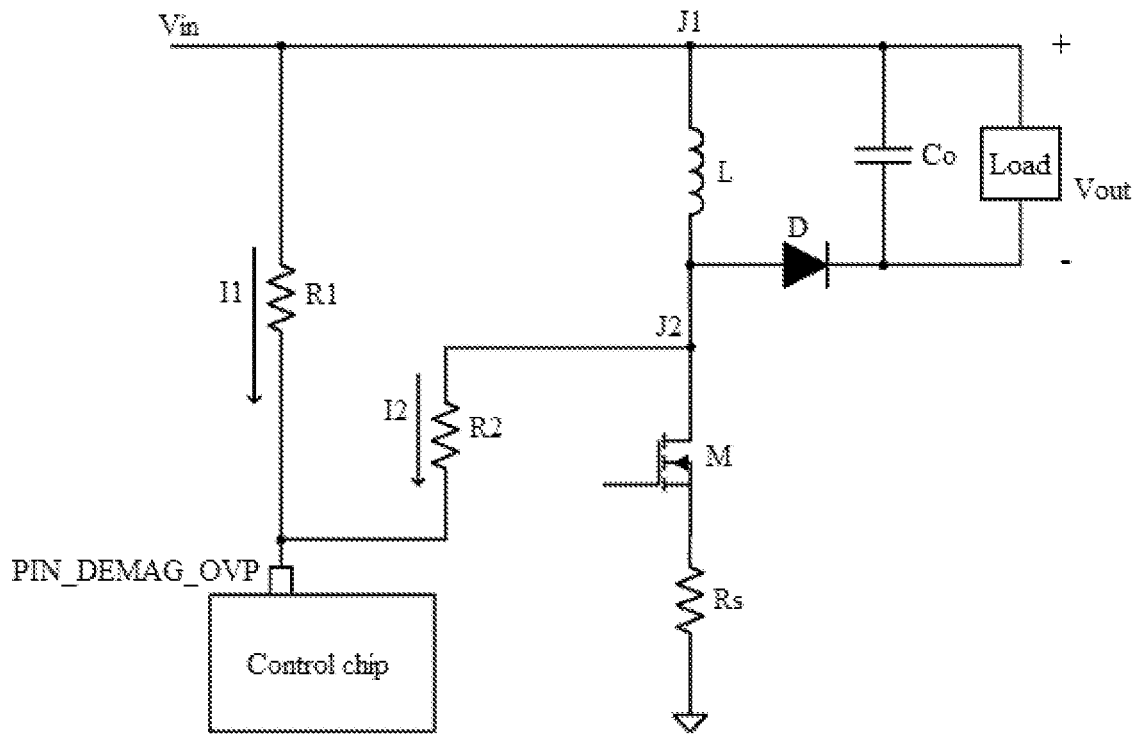
FIG. 1 is a schematic block diagram of a first example switching power supply circuit configured to perform a detection method, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Switching power supplies are widely applied in the driving of light-emitting diode (LED) light. In this application, it may be desirable that the switching power supply has good constant current output control. In order to achieve this purpose, the demagnetization time of an inductor of the switching power supply may need to be detected. That is, a zero crossing point of an inductor current may need to be detected. For the switching power supply of which a reference voltage at a negative terminal of an output terminal is zero, voltage divider resistors may be used to feed back the output voltage. In an isolated converter, the feedback signal of the output voltage may also be obtained by using the auxiliary winding. The controller may directly detect the output voltage based on the feedback signal of the output voltage. In some switching power supplies, the demagnetization time instant of the inductor may generally be detected by detecting the voltage at the high-voltage terminal of the power switch. Alternatively, an auxiliary winding can be added to the inductor, and the voltage across the auxiliary winding may be detected in order to detect the demagnetization time instant.

The controller in some switching power supplies may be provided with two detection pins, in order to detect the output voltage and the demagnetization time instant, and this may not facilitate miniaturization of the switching power supply. For some switching power supplies of which a reference voltage at a negative terminal of an output terminal is not zero, it may not be suitable to have output information of the switching power supply directly fed back by using a resistor divider network or an auxiliary winding, in order to detect an output voltage. In particular embodiments, a detection method can be used for detecting an output voltage of a switching power supply, and in particular for detecting an output voltage of a switching power supply of which a reference voltage at a negative terminal of an output terminal is not zero.

In particular embodiments, a detection method can include acquiring a first branch current (e.g., I1) that changes with a first voltage at a first terminal (e.g., J1) of an inductor of the switching power supply. The detection method can also include acquiring a second branch current (e.g., I2) that changes with a second voltage at a second terminal (e.g., J2) of the inductor. The detection method can also include controlling both the first and second branch currents to flow to a same detection terminal. The detection method can also include detecting the output voltage based on a first current flowing through the detection terminal during a first time period, and a second current flowing through the detection terminal during a second time period. The "first time period" may be a time period during which a main power switch in the switching power supply is turned on, and the "second time period" may be a time period during which the main power switch in the switching power supply is turned off. The "first current" may be a sum of the first and second branch currents during the first time period, and the "second current" may be a sum of the first and second branch currents during the second time period.

For example, the first terminal of the inductor may be a current input terminal of the inductor, and the second terminal of the inductor can be a current output terminal of the inductor. In one example, the first branch current that changes with the first voltage at the first terminal of the inductor of the switching power supply, and the second branch current that changes with the second voltage at the second terminal of the inductor may be acquired by setting a voltage at the detection terminal as a "third voltage" being a fixed value in the following way. A difference between the first and third voltages may be converted into a current to acquire the first branch current, and a difference between the second and third voltages may be converted into a current to acquire the second branch current.

Referring now to FIG. 1, shown is a schematic block diagram of a first example switching power supply circuit configured to perform a detection method, in accordance with embodiments of the present invention. In this particular example, the switching power supply has a buck-boost topology, i.e., a buck-boost type, and in the example of FIG. 2, the switching power supply has a buck topology, i.e., a buck type. However, any suitable topology structure of each switching power supply may be applied in certain embodiments.

Figure 2:
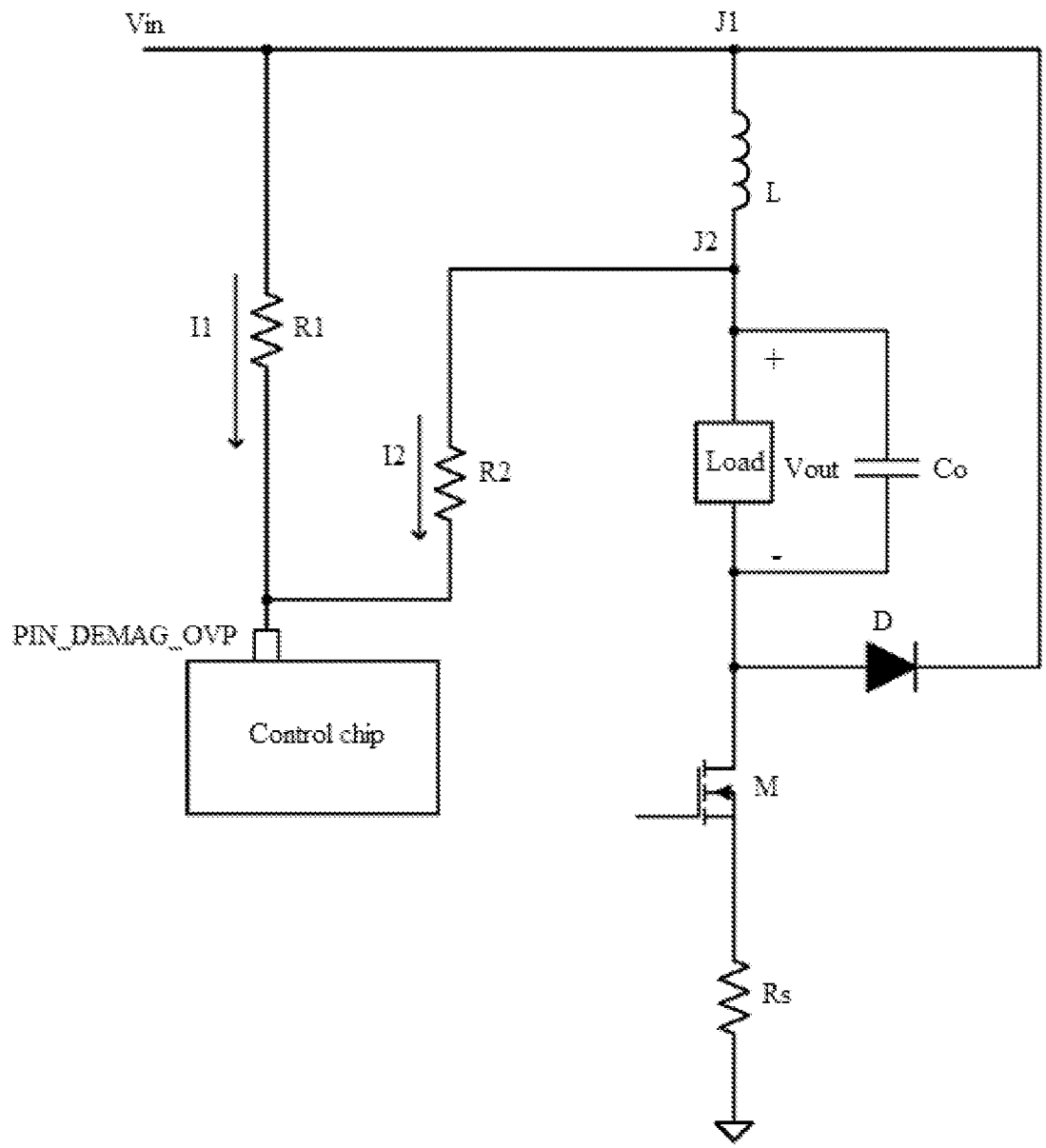
FIG. 2 is a schematic block diagram of a second example switching power supply circuit configured to perform a detection method, in accordance with embodiments of the present invention.

As shown in FIGS. 1 and 2, the example switching power supplies have a reference voltage at a negative terminal of an output terminal that is not zero (e.g., not grounded), but the application scenario of detection methods as described herein are not limited thereto. Each example switching power supply can include a main power converter formed by inductor L, diode D, capacitor Co, and main power switch M, and a controller for controlling the main power converter. The connection of inductor L, diode D, capacitor Co, and main power switch M can be as exemplified in FIGS. 1 and 2. In FIGS. 1 and 2, the controllers in each switching power supply can include a control chip and a peripheral circuit located at the periphery of the control chip.

For example, the peripheral circuit may include a first branch current generation circuit configured to generate branch current I1, and a second branch current generation circuit configured to generate branch current I2. The first branch current generation circuit can connect between node J1 of inductor L and a detection terminal, and the second branch current generation circuit can connect between node J2 of inductor L and the detection terminal. For example, the detection terminal can connect to pin PIN_DEMAG_OVP of the control chip. The control chip may be provided with a clamping circuit inside, in order to set a voltage at pin PIN_DEMAG_OVP as a third voltage that is a fixed value. In this case, the first branch current generation circuit may convert a difference between first and third voltages into the first branch current I1 by resistor R1, and the second branch current generation circuit may convert a difference between second and third voltages into branch current I2 by resistor R2.

Both branch currents I1 and I2 may flow to the detection terminal (e.g., pin PIN_DEMAG_OVP). In addition, the control chip may be provided with an output voltage detection circuit configured to detect an output voltage of the switching power supply based on the first and second currents. For example, detecting the output voltage by the output voltage detection circuit may include acquiring a characterization parameter for characterizing the output voltage based on the first and second currents, and comparing the characterization parameter against a reference parameter in order to detect the output voltage.

For example, the process of acquiring the characterization parameter for characterizing the output voltage based on the first and second currents may include: acquiring and storing, during the first time period, a first proportion parameter that is in a first proportion to the first current; acquiring, during the second time period, a second proportion parameter that is in a second proportion to the second current; and acquiring the characterization parameter based on a difference between the first and second proportion parameters. A ratio of a resistance between the second terminal of the inductor and the detection terminal to a resistance between the first terminal of the inductor and the detection terminal is equal to k. That is, an equivalent resistance of the second branch current generation circuit is k times of an equivalent resistance of the first branch current generation circuit, and k times the first proportion is equal to (k+1) times the second proportion. An example detection circuit for performing the example detection method in certain embodiments can include the first and second branch current generation circuits, and the output voltage detection circuit, as described herein. The first detection circuit may be part of the controller of the switching power supply.

As shown in the example of FIG. 1, in a time period during which main power switch M is turned on (i.e., during the first time period), the first voltage at node J1 is a direct current input voltage Vin of a main power stage circuit of the switching power supply, and the second voltage at node J2 is a voltage across resistor Rs, which is generally a relatively low voltage. Therefore, the second voltage may be considered to be zero in the time period during which main power switch M is turned on. In a time period during which main power switch M is turned off (i.e., during the second time period), the first voltage at node J1 may still be direct current input voltage Vin of the main power stage circuit of the switching power supply, and the second voltage at the node J2 can be equal to Vin+Vout, where Vout is the output voltage of the switching power supply. The third voltage at pin PIN_DEMAG_OVP may be clamped to be a fixed value. For facilitating detecting output voltage Vout, the third voltage may be set as a low fixed voltage Vc (e.g., Vc=3V). The third voltage may be substantially set as a value close to the voltage across resistor Rs when main power switch M is turned on. This value may generally be much less than input voltage Vin.

The equivalent resistance of the first branch current generation circuit is R1, and the equivalent resistance of the second branch current generation circuit is R2. As described above, R2=kR1 (R2 is equal to k times of R1). During the first time period, branch current I1 is equal to (Vin−Vc)/R1. Since the third voltage is close to the voltage across resistor Rs when main power switch M is turned on, branch current I2 may be considered to be approximately equal to zero during the first time period. In this case, "first" current It1 flowing through pin PIN_DEMAG_OVP during the first time period may be indicated by It1=I1+I2=(Vin−Vc)/R1. During the second time period, branch current I1 is equal to (Vin−Vc)/R1, and branch current I2 is equal to (Vin+Vout−Vc)/kR1. In this case, "second" current It2 flowing through pin PIN_DEMAG_OVP during the second time period can be as indicated by It2=I1+I2=[(k+1)(Vin−Vc)+Vout]/kR1. Due to kIt2−(k+1)It1=Vout/R1, characterization parameter Vout/R1 for output voltage Vout may be acquired based on currents It1 and It2.

In this example, a first proportion parameter that is in a first proportion to current It1 may be acquired and stored during the first time period, and a second proportion parameter that is in a second proportion to current It2 can be acquired during the second time period. The first and second proportions may meet a condition that k times of the first proportion is equal to (k+1) times of the second proportion. Characterization parameter Vout/R1 may be acquired based on a difference between the first and second proportion parameters. Characterization parameter Vout/R1 can be compared against a reference parameter in order to detect output voltage Vout. In this way, whether current output voltage Vout is an overvoltage can be determined, thereby protecting the switching power supply.

Referring now to FIG. 2, shown is a schematic block diagram of a second example switching power supply circuit configured to perform a detection method, in accordance with embodiments of the present invention. In this particular example switching power supply, in a time period during which main power switch M is turned on, the voltage at node J1 is direct current input voltage Vin of a main power stage circuit of the switching power supply, and the second voltage at node J2 is output voltage Vout. In a time period during which main power switch M is turned off, the first voltage at node J1 is still direct current input voltage Vin of the main power stage circuit of the switching power supply, and the second voltage at node J2 is equal to Vin+Vout+Vd, where Vd is a voltage across diode D in the switching power supply in this example. The third voltage at pin PIN_DEMAG_OVP may be clamped to be a fixed value. For facilitating detecting output voltage Vout, the third voltage may be set as a low fixed voltage Vc (e.g., Vc=3V). The equivalent resistance of the first branch current generation circuit is R1, and the equivalent resistance of the second branch current generation circuit is R2.

As described above, R2=kR1 (R2 is equal to k times of R1). During the first time period, branch current I1 is equal to (Vin−Vc)/R1, and branch current I2 is equal to (Vout−Vc)/kR1. In order to simplify the subsequent derivation, both of Vc and Vd may be temporarily ignored during the subsequent derivation process since both Vc and Vd are relatively small fixed values (e.g., both of Vc and Vd are considered to be zero in this example). In this case, current It1 flowing through pin PIN_DEMAG_OVP during the first time period may be indicated by It1=I1+I2=(kVin+Vout)/kR1. During the second time period, branch current I1 is equal to (Vin−Vc)/R1, and branch current I2 is equal to (Vin+Vout+Vd−Vc)/kR1. In this case, current It2 flowing through pin PIN_DEMAG_OVP during the second time period may be indicated by It2=I1+I2=[(k+1) Vin+Vout]/kR1. Due to (k+1) It1−kIt2=Vout/kR1, characterization parameter Vout/kR1 for output voltage Vout may be acquired based on currents It1 and It2.

In this example, a first proportion parameter that is in a first proportion to current It1 may be acquired and stored during the first time period, and a second proportion parameter that is in a second proportion to current It2 can be acquired during the second time period. The first and second proportions can meet a condition that k times the first proportion is equal to (k+1) times the second proportion. Characterization parameter Vout/kR1 may be acquired based on a difference between the first and second proportion parameters. Characterization parameter Vout/kR1 can be compared against a reference parameter to detect output voltage Vout. In this way, whether current output voltage Vout is an overvoltage can be determined, thereby protecting the switching power supply.

In the switching power supply described above, since voltages Vc and Vd are ignored in the calculation process, detected output voltage Vout may from the actual output voltage by a reserved amount which is determined by Vc and Vd. Since voltages Vc and Vd are generally low, the reserved amount may also be small and thus may not affect detection on the output voltage. For example, during the process of comparing the characterization parameter for output voltage Vout against the reference parameter, the reference parameter may be set based on the reserved amount, thereby accurately detecting the output voltage. In addition, this example detection method may also be used to detect input voltage Vin. Since the relationship between output voltage Vout and input voltage Vin may be determined based on the topology of the switching power supply, input voltage Vin may be obtained after output voltage Vout is detected.

In order to detect both an output voltage of a switching power supply and a demagnetization time instant of an inductor of the switching power supply by using the same pin, another detection method may be provided in particular embodiments. This particular detection method may differ from detection method discussed above in that the demagnetization time instant of the switching power supply may be detected based on the first and second currents. In this particular example, the controller shown in FIGS. 1 and 2 can include a second detection circuit for performing a second detection method. The second detection circuit can include the first and second branch current generation circuits as described above. The second detection circuit can also include a demagnetization time instant detection circuit connected to pin PIN_DEMAG_OVP. The demagnetization time instant detection circuit can detect the demagnetization time instant of the inductor of the switching power supply based on the first and second currents.

For example, the demagnetization time instant detection circuit may detect the demagnetization time instant based on the first current flowing through the detection terminal during the first time period, and the second current flowing through the detection terminal during the second time period. For example, information on the first current can be acquired and stored during the first time period, and whether the second current meets a predetermined condition can be detected during the second time period. If the second current meets the predetermined condition, this can indicate that demagnetization of the inductor ends. The predetermined condition may be a relation between the first and second currents at a time instant when the first voltage is equal to the second voltage.

In the example switching power supply with the buck-boost topology shown in FIG. 1, current It1 flowing through pin PIN_DEMAG_OVP during the first time period may be indicated by It1=I1+I2=(Vin-Vc)/R1, and current It2 flowing through pin PIN_DEMAG_OVP during the second time period may be indicated by It2=I1+I2=[(k+1)(Vin−Vc)+Vout]/kR1. In the time period during which main power switch M is turned on, the current in inductor L can increase. In the time period during which main power switch M is turned off, inductor L may have a freewheel current, and the current in inductor L can decrease until the second voltage at terminal J2 of the inductor L is equal to the first voltage at node J1, which indicates that the demagnetization of inductor L ends. At this time instant, the second voltage is Vin, and current It2 is indicated by It2=I1+I2=[(k+1)(Vin−Vc)]/kR1. The relationship between currents It2 and It1 during the first time period (i.e., the predetermined condition) is that k times current It2 is equal to (k+1) times current It1.

Detecting the demagnetization time instant based on the first current flowing through the detection terminal during the first time period, and the second current flowing through the detection terminal during the second time period, may be performed as follows. During the first time period, a third proportion parameter that is in a third proportion to current It1 can be acquired and stored. During the second time period, a fourth proportion parameter that is in a fourth proportion to current It2 may be compared against the third proportion parameter to detect whether the second current meets the predetermined condition, in order to detect whether demagnetization of the inductor ends. The third and fourth proportions may meet a condition whereby (k+1) times the fourth proportion is equal to k times the third proportion. For example, in the case of k=1, 2 times current It1 may be acquired and stored during the first time period, and current It2 (e.g., the fourth proportion is 1) may be directly compared against the stored 2 times of current It1 during the second time period. In the case that current It2 is equal to the stored 2 times of current It1, it can be indicated that demagnetization of inductor L has completed.

In the example switching power supply with the buck topology shown in FIG. 2, current It1 flowing through pin PIN_DEMAG_OVP during the first time period may be indicated by It1=I1+I2=(kVin+Vout)/kR1, and current It2 flowing through pin PIN_DEMAG_OVP during the second time period can be indicated by It2=I1+I2=[(k+1)Vin+Vout]/kR1. In FIG. 2, at the time instant when demagnetization of inductor L ends, voltage is Vin, and current It2 is indicated by It2=I1+I2=[(k+1)(Vin−Vc)]/kR1. In order to simplify the derivation, the values of voltages Vc and Vd may be ignored in this particular example.

In this case, current It2 before the time instant when the demagnetization of inductor L ends can be indicated by It2=I1+I2=[(k+1)Vin+Vout]/kR1, and current It2 at the time instant when the demagnetization of inductor L ends may be indicated by It2=I1+I2=(k+1)Vin/kR1. The second current before the time instant when the demagnetization of inductor L ends can be indicated as It21, and the second current at the time instant when the demagnetization of inductor L ends may be indicated as It22, i.e., It21=[(k+1)Vin+Vout]/kR1, and It22=(k+1)Vin/kR1. Due to It21−It1=Vin/kR1, It22 may be equal to (k+1)(It21−It1). Since the values of Vc and Vd can be ignored during the derivation process, It22+ΔV may actually be equal to (k+1)(It21−It1), where ΔV is a reserved amount determined based on Vc and Vd. For example, the values of Vc and Vd may be set appropriately for the sake of simplifying design of the circuit. The values of Vc and Vd can be set such that the values have little influence on the demagnetization time instant detection of inductor L, and may even be negligible when the reserved amount ΔV is zero.

In the switching power supply shown in FIG. 2, the predetermined condition can be a condition that (k+1) times a first difference between the first and second currents before a time instant when the first voltage is equal to the second voltage can be equal to a sum of the second current and a reserved amount at the time instant when the second voltage is equal to the first voltage. The process of detecting the demagnetization time instant based on the first current flowing through the detection terminal during the first time period, and the second current flowing through the detection terminal during the second time period may be performed as follows. During the first time period, a fifth proportion parameter that is in a fifth proportion to current It1 can be stored. During the second time period, a second difference between a sixth proportion parameter that is in a sixth proportion to current It2, and the fifth proportion parameter may be acquired, in order to acquire the first difference between the second current and the first current before the time instant when the first voltage is equal to the second voltage, i.e., It2−It1.

A seventh proportion parameter that is in a seventh proportion to current It2 may be compared against the second difference to detect whether the second current meets the predetermined condition, in order to detect whether demagnetization of the inductor ends. In a case that the fifth proportion is equal to the sixth proportion (e.g., both of the fifth and sixth proportions are equal to 1), a ratio of the seventh proportion to the sixth proportion may be equal to a ratio of the first difference to the second difference. For example, in the case of k=1, current It1 may be stored during the first time period, and two times a difference between currents It2 and It1 may initially be acquired. Then, current It2 can be compared against two times the difference during the second time period. In the case that current It2 is equal to the two times of the difference, this can indicate that the demagnetization of inductor L has ended.

In order to reduce the number of controller pins so as to facilitate miniaturization of the switching power supply, the above-mentioned pin PIN_DEMAG_OVP may function as a multiplexed pin for detecting the output voltage and the demagnetization time instant as described herein. That is, in the first example, in addition to detecting the output voltage based on currents It1 and It2 flowing through pin PIN_DEMAG_OVP, the control chip may further be provided with the demagnetization time instant detection circuit. Thus, the demagnetization time instant may be detected based on the first and second currents according to the demagnetization time instant detection approach discussed above.

In addition to detecting the demagnetization time instant based on currents It1 and It2 flowing through pin PIN_DEMAG_OVP, the control chip may further be provided with the output voltage detection circuit. Thus, the output voltage may be detected based on the first and second currents according to the example output voltage detection method discussed above. In the case that pin PIN_DEMAG_OVP serves as the multiplexed pin for output voltage detection and demagnetization time instant detection, the first detection circuit for detecting the output voltage, and the second detection circuit for detecting the demagnetization time instant in the controller of the switching power supply may share the first and second branch current generation circuits.

In this way, both the output voltage of the switching power supply and the demagnetization time instant of the inductor of the switching power supply can be detected by using the same pin, thereby facilitating the miniaturization of the switching power supply, and reducing manufacturing costs of the switching power supply.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of detecting an output voltage of a switching power supply, the method comprising:
   a) acquiring a first branch current that changes with a first voltage at a first terminal of an inductor of the switching power supply;
   b) acquiring a second branch current that changes with a second voltage at a second terminal of the inductor;
   c) controlling the first and second branch currents to flow to a same detection terminal, wherein a voltage at the detection terminal is set as a third voltage that is a fixed value, a difference between the first and third voltages is converted to acquire the first branch current, and a difference between the second and third voltages is converted to acquire the second branch current; and
   d) detecting the output voltage based on a first current flowing through the detection terminal during a first time period, and a second current flowing through the detection terminal during a second time period, e) wherein the first time period is a time period during which a main power switch in the switching power supply is turned on, and the second time period is a time period during which the main power switch is turned off.

2. The method of claim 1, further comprising:
a) acquiring and storing, during the first time period, a first proportion parameter that is in a first proportion to the first current;
b) acquiring, during the second time period, a second proportion parameter that is in a second proportion to the second current; and
c) acquiring a characterization parameter based on a difference between the first and second proportion parameters, wherein a ratio of a resistance between the second terminal of the inductor and the detection terminal to a resistance between the first terminal of the inductor and the detection terminal is equal to k, and k times the first proportion is equal to (k+1) times the second proportion.

3. A detection circuit configured to perform the method of claim 1, the detection circuit comprising:
a) a first pin connected to the detection terminal;
b) a first branch current generation circuit configured to generate the first branch current;
c) a second branch current generation circuit configured to generate the second branch current; and
d) an output voltage detection circuit configured to detect the output voltage based on the first and second currents.

4. A method of detecting a demagnetization time instant of an inductor of a switching power supply, the method comprising:
a) acquiring a first branch current that changes with a first voltage at a first terminal of the inductor of the switching power supply;
b) acquiring a second branch current that changes with a second voltage at a second terminal of the inductor;
c) controlling the first and second branch currents to flow to a same detection terminal, wherein a voltage at the detection terminal is set as a third voltage that is a fixed value, the first terminal of the inductor is a current input terminal of the inductor, the second terminal of the inductor is a current output terminal of the inductor, a difference between the first and third voltages is converted to acquire the first branch current, and a difference between the second and third voltages is converted to acquire the second branch current; and
d) detecting the demagnetization time instant based on a first current flowing through the detection terminal during a first time period, and a second current flowing through the detection terminal during a second time period,
e) wherein the first time period is a time period during which a main power switch in the switching power supply is turned on, and the second time period is a time period during which the main power switch is turned off.

5. The method of claim 4, wherein detecting the demagnetization time instant based on the first current flowing through the detection terminal during the first time period and the second current flowing through the detection terminal during the second time period comprises:
a) acquiring and storing information on the first current during the first time period;
b) detecting whether the second current meets a predetermined condition during the second time period; and
c) detecting that the demagnetization of the inductor ends when the second current meets the predetermined condition, wherein the predetermined condition is a relation between the first and second currents at a time instant when the first voltage is equal to the second voltage.

6. The method of claim 5, wherein:
a) a topology of the switching power supply is a buck-boost topology;
b) the predetermined condition is a condition that k times of the second current is equal to (k+1) times of the first current; and
c) k is a ratio of a resistance between the second terminal of the inductor and the detection terminal to a resistance between the first terminal of the inductor and the detection terminal.

7. The method of claim 6, wherein detecting the demagnetization time instant based on the first current flowing through the detection terminal during the first time period and the second current flowing through the detection terminal during the second time period comprises:
a) acquiring and storing, during the first time period, a first proportion parameter that is in a first proportion to the first current; and
b) detecting, during the second period, whether the second current meets the predetermined condition by comparing a second proportion parameter that is in a second proportion against the second current with the first proportion parameter, in order to detect whether demagnetization of the inductor ends.

8. The method of claim 5, wherein:
a) a topology of the switching power supply is a buck topology;
b) the predetermined condition is a condition that (k+1) times of a first difference between the first and second currents before a time instant when the first voltage is equal to the second voltage is equal to a sum of the second current and a reserved amount at the time instant when the second voltage is equal to the first voltage; and
c) k is a ratio of a resistance between the second terminal of the inductor and the detection terminal to a resistance between the first terminal of the inductor and the detection terminal.

9. The method of claim 5, wherein detecting the demagnetization time instant based on the first current flowing through the detection terminal during the first time period, and the second current flowing through the detection terminal during the second time period comprises:
a) storing, during the first time period, a third proportion parameter that is in a third proportion to the first current;
b) acquiring, during the second time period, a second difference between a fourth proportion parameter that is in a fourth proportion to the second current and the third proportion parameter, to acquire the first difference between the first and second currents before the time instant when the first voltage is equal to the second voltage; and
c) detecting whether the second current meets the predetermined condition by comparing a fifth proportion parameter that is in a fifth proportion against the second current with the second difference, in order to detect whether the demagnetization of the inductor ends.

10. A detection circuit for performing the method of claim 4, the detection circuit comprising:
- a) a first pin connected to the detection terminal;
- b) a first branch current generation branch configured to generate the first branch current;
- c) a second branch current generation branch configured to generate the second branch current; and
- d) a demagnetization time instant detection circuit configured to detect the demagnetization time instant of the inductor of the switching power supply based on the first and second currents.

* * * * *